Oct. 7, 1941.     L. F. KENNEDY     2,258,251
PROTECTION OF ALTERNATING CURRENT ELECTRIC SYSTEMS
Filed March 5, 1940
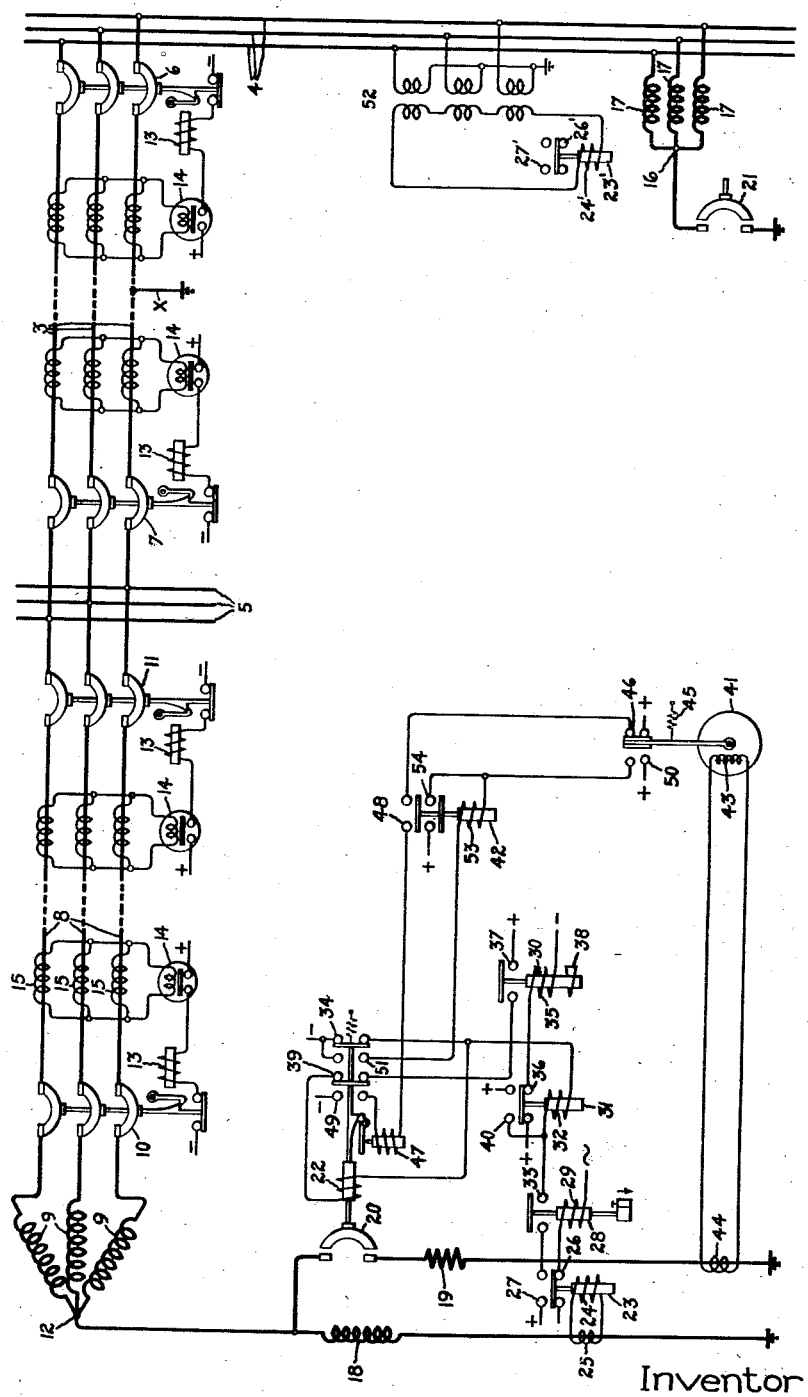
Inventor:
Luke F. Kennedy,
by Harry E. Dunham
His Attorney.

Patented Oct. 7, 1941

2,258,251

UNITED STATES PATENT OFFICE 2,258,251

PROTECTION OF ALTERNATING CURRENT ELECTRIC SYSTEMS

Luke F. Kennedy, Schenectady, N. Y., assignor to General Electric Company, a corporation of New York Application March 5, 1940, Serial No. 322,351

9 Claims. (Cl. 175—294)

My invention relates to improvements in the protection of alternating current electric systems and more particularly to ground fault protection of alternating current electric systems of the type wherein a fault to ground on a phase conductor of the system substantially increases the capacitance current to ground of the ungrounded phase conductors of the system.

A large percentage of the faults on alternating current electric systems involves, initially at least, only a single conductor to ground. Most of these are of a transient or arcing character. It is, therefore, desirable, whenever possible, to clear such faults without circuit breaker operations. Such arcing ground faults may be cleared by arc suppressing or ground fault neutralizing apparatus of the type disclosed in United States Letters Patent 1,537,371, issued May 12, 1925. Such apparatus by itself is effective only on alternating current electric systems of the type wherein a fault to ground on a phase conductor of the system substantially increases the capacitance current to ground of the ungrounded phase conductors of the system.

In such systems it is impractical, in case of faults which the ground fault neutralizer cannot suppress, to secure that selectivity of relay operation which will, in case of such faults, disconnect only the faulty portion of the system and yet maintain continuity of service on sound portions. This is in part due to insufficient fault current to insure the necessary discrimination within the sensitivity limits of the relays. Moreover, when selectivity is based on the use of ground fault directional relays, the variation in power factor at any point of the system, in dependence on the location of the fault even though the power factor may change in sign, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined since there is usually plenty of fault current with a large power factor variant for different fault locations. Accordingly, if after a predetermined time sufficient for the ground fault neutralizer to clear a transient fault, the fault still exists, it is desirable to put the system grounding connections in condition to correspond with the prearranged selectivity of the ground fault relays so that they may have an opportunity to clear the fault. In effecting this grounding it is, of course, desirable that the several grounding switches be closed as nearly together as possible. Since this is difficult to accomplish, the closing of one grounding switch must not occur before the closing impulse has been given to all the grounding switches. Otherwise, one or more may fail to close and thus prevent that grounding of the system for which the relays are set.

If the ground fault relays operate correctly to clear the fault, the system should be returned to ground fault neutralizer operation with the minimum of delay so as to be ready for further faults. In those cases where the fault is not cleared by the action of the ground fault neutralizers, it is important that for any one fault, the grounding switches close and open only once. In other words, for any one fault, repetitions of these switching operations, sometimes referred to as pumping, should not occur. Moreover, depending in part on the type of grounding switch used, it may be desirable to effect the automatic opening of this switch only after cessation of current flow in the grounding connection established by the switch.

One object of my invention is to provide an improved protective arrangement for automatically controlling the reopening of the ground switch whereby to restore the system to ground fault neutralizer operation as soon as and only after a fault has been cleared by the ground fault relays. Another object of my invention is to provide an improved protective arrangement whereby for any one ground fault not cleared by the ground fault neutralizing means only one circuit closing and opening of the switching means used to establish the desired grounding can occur. These and other objects of my invention will hereinafter appear in more detail.

My invention will be better understood from the following description when considered in connection with the accompanying drawing, and its scope will be pointed out in the appended claims.

The single figure of the accompanying drawing illustrates diagrammatically an embodiment of my invention as applied to the protection of a three-phase alternating current electric power system which includes a power line 3 interconnecting two stations indicated by busses 4 and 5 through suitable circuit interrupting means, such as latched closed circuit breakers 6 and 7. As shown, the system also includes another power line 8 interconnecting the station busses 5 and Y-connected windings 9 through suitable circuit interrupting means, such as latched closed circuit breakers 10 and 11. The windings 9, which provide a neutral point 12, may be those of a power transformer, or otherwise, at some suitable point of the system. The power lines 3 and 8 are shown partly in broken lines merely to give a concept of distance. It will, of course, be understood that the power system may include other stations associated with power lines extending from the portion of the system illustrated, but I have shown only as much of the system as is necessary to an understanding of my invention.

For controlling the opening of the circuit breakers 6, 7, 10 and 11 through their trip coils 13, suitable relaying means responsive to ground faults are provided. As illustrated, these relaying means comprise simple overcurrent relays 14. These may be of the induction disk time limit type, examples of which are well known to the art. For more selective action, the ground fault responsive relays may be of the two-coil directional type, examples of which are also well known to the art. For response to ground faults, the relays 14 may be connected to be energized in accordance with the sum of the currents in the line conductors at the relay location. One way in which this may be done is to connect the windings of the relays across parallel connected current transformers 15.

The neutral point 12 of the windings 9 may be used for grounding purposes. Other neutral points suitably derived may be similarly used. Thus at station 4 the neutral point 16 may be established by the Y-connected windings 17. The neutral points 12 and 16 are, in accordance with my invention, arranged to be connected to ground to establish that grounding of the system on which the prearranged settings of the system ground fault relays 14 are based so as to insure the desired selectivity of relaying operation.

Inasmuch, however, as it is desirable to clear as many ground faults as possible without circuit breaker operation, at least one of the neutral points 12 is grounded through suitable arc suppressing apparatus, such as a ground fault neutralizer 18, after the manner and for the purpose disclosed in the previously mentioned United States Letters Patent 1,537,371. Depending on the extent of the system and also whether or not it may at times be operated as a divided system, ground fault neutralizers may be provided at other points of the system. The ground fault neutralizer 18 is an inductance device whose zero phase sequence inductance is such as to provide, on the occurrence of a ground on a phase conductor of the system, a lagging current for effectively suppressing the capacitance current to ground at the fault. Where more than one neutralizer is provided on the system, the suppressing effect of each neutralizer will be sufficient to take care of a predetermined portion of the system, such portion being determined by the probable division of the system under different operating conditions. Then, when the whole system is in service, all of the neutralizers share in providing sufficient lagging current to neutralize the capacitance current to ground in case of a ground fault. For the purpose of illustrating my invention, it will be assumed that, upon the occurrence of a ground fault anywhere on the system shown, enough lagging current is caused to flow in the neutralizer 18 to neutralize the capacitance current to ground of the ungrounded phase conductors of the system so that the fault, if of a transient character, is cleared.

When the fault is not of a transient character, however, resort may be had to circuit breaker operation so as to isolate the faulty portion of the system without disturbing continuity of service on sound portions. It is then necessary to rely upon the ground fault relays 14, but their action, as heretofore pointed out, can only be selective for that predetermined grounding of the system for which prearranged relay settings are made. Accordingly, means are provided for effecting this grounding a predetermined time after the appearance of a fault, in other words, after a time sufficient for the ground fault neutralizers to suppress the fault if of a transient character. Thus at the point where the ground fault neutralizer 18 is located, I provide means for establishing another connection to ground independent of the ground fault neutralizer, and at station 4 to establish a connection to ground from the neutral point 16. The connection to ground around the neutralizer 18 may include an impedance means 19 depending upon the amount of impedance it is necessary to have in the ground connection to provide the desired response of the ground fault relays 14. Similarly other grounding connections may include impedance devices, as desired, for selective ground fault relaying. These connections to ground may be established in any suitable manner, but I propose to accomplish them by closing normally open switching means 20 and 21 a predetermined time after the appearance of a ground fault.

For this purpose the switching means 20, which is illustrated as a latched closed type of circuit breaker having a closing winding 22, may have its closing operation initiated in response to the flow of the current appearing in the neutralizer 18 on the occurrence of a ground fault on a phase conductor of the system. The closing impulse may be given by any suitable ground fault responsive means, such as an overcurrent relay 23, whose energizing winding 24 is connected through suitable means such as a current transformer 25 for energization in dependence on the current flowing in the neutralizer 18.

For giving a switch closing impulse, the overcurrent fault detector relay 23 is provided with circuit opening contacts 26 and circuit closing contacts 27. A desired time interval after the response of the relay 23 for the neutralizer 18 to accomplish its fault suppressing action may be secured by a time delay relay 28. This relay may be of any suitable type, examples of which are well known to the art. As illustrated, it is a normally energized circuit closing relay, the circuit of its winding 29 being completed by the normally closed contacts 26 of the fault detector 23.

In order to insure that the closing impulse is given to all of the grounding switches before any one switch can close ahead of the others and thus upset the flow of ground fault current desired and possibly prevent the closing of other grounding switches, the closing impulse, instead of coming directly from the time relay 28, may be given to a time delay drop out circuit closing relay 30 through an intermediate auxiliary relay 31. In this way it is possible to compensate for differences in operation of the time delay drop out relays 28 at the different locations in the event that any two of these should have a difference in operating time exceeding the closing time of one of the grounding switches which they control.

The intermediate auxiliary relay 31 has its winding 32 connected in series with the circuit closing contacts 27 of the fault detector 23, the circuit closing contacts 33 of the time delay drop out relay 28 and the b auxiliary switch contacts 34 of the switch 20. The winding 35 of the closing time delay drop out relay 30 is normally energized through the circuit opening contacts 36 of the auxiliary relay 31 so that, upon operation of this relay, the closing relay 30 is deenergized to drop out and close its contacts 37 with a time delay which may be effected by suitable means, such as a short-circuited winding 38. The closing of the contacts 37 of the closing relay 30 completes the circuit of the closing winding through the series connected b auxiliary switch contacts 34 and 39 of the switch 20. In order to insure the completion of a closing operation once the auxiliary relay 31 is energized, this relay is arranged to seal itself in through circuit closing contacts 40.

In order to effect the opening of the grounding switch 20 upon cessation of current flow in the grounding connection through this switch and so that there may be but one closing and opening of the switch for any one fault, I provide means, such as an overcurrent relay 41 which is responsive to the current flowing in the grounding connection through the switch for effecting the energization of a single impulse device, such as a sealing-in relay 42 which in its sealed-in position cooperates with the relay 41 to effect the opening of the switch. As schematically represented, the relay 41 is of the induction disk type, its energizing winding 43 being connected to be energized from a current transformer 44 in the ground connection through the switch 20. Normally the relay 41 is biased by suitable means, such as a spring 45, to close its contacts 46 in the energizing circuit of a releasing means, such as a trip coil 47, for opening the switch 20. In order that the energization of this trip coil may occur only after current flow in the grounding connection through the switch 20 has occurred and ceased, the trip coil circuit includes the normally open contacts 48 of the sealing-in relay 42 and also may include a auxiliary switch contacts 49. Moreover, the circuit of the sealing-in relay 42 includes the normally open contacts 50 of the relay 41 and a auxiliary switch contacts 51.

The closing and opening of the grounding switch 21 may be controlled in substantially the same manner as the switch 20 except for the fault responsive relays which initiate the operation. Thus at station 4 the closing operation may be initiated by a ground fault responsive relay 23' which has circuit opening contacts 26' and circuit closing contacts 27' for effecting the closing impulse of the grounding switch. For ground fault response the relay 23' may have its energizing winding 24' connected to close the delta of a wye-delta connected potential transformer 52 which is energized from the busses 4. The remaining equipment at station 4 for controlling the switch 21 being essentially the same as that for the switch 20 requires no further description or illustration.

Assuming the parts positioned as shown in the drawing and also that a fault occurs to ground on one of the phase conductors of the line 3, as indicated by X, then the voltages to ground at the neutral points 12 and 16 are substantially the wye voltage of the system. Accordingly, lagging current flows, in consequence of the neutralizer 18, to the grounded point X in an amount substantially equal but opposite in phase to the capacitance current to ground of the ungrounded phase conductors of the system. The flow of current in the neutral connection through the ground fault neutralizer 18 energizes the overcurrent relay 23 which opens its contacts 26 to release the timing relay 29 and closes its contacts 27 in the circuit of the intermediate auxiliary relay 31. If the ground fault neutralizer 18 functions to suppress the ground fault current before the timing relay 28 closes its contacts 33, the overcurrent relay 24 is dropped out to pick up the timer relay 28 and thus prevent the closing of the grounding switch 20. If, however, the ground fault is not of a transient character such that the ground fault neutralizer 18 can suppress the fault, the timing operation of the timing relay 28 is continued until the closing of its contacts 33 completes the circuit of the intermediate relay 32 through the b auxiliary switch contacts 34. When the intermediate relay 31 operates, it opens its contacts 36 in the circuit of the winding 35 of the time delay closing relay 30 and seals itself in through its circuit closing contacts 40 to insure the completion of the closing operation of the switch 20.

Upon closure of the switch 20, current flow in the grounding connection through this switch energizes the ground fault responsive relay 41 so that this relay opens its contacts 46 in the circuit of the trip coil 47 and closes its contacts 50 in the circuit of the winding 53 of the sealing-in relay 42. Since the a auxiliary switch contacts 51 are closed, the sealing-in relay 53 is picked up and seals itself in through its circuit closing contacts 54 and closes its contacts 48 so as to insure energization of the tripping coil 47 upon cessation of current flow in the grounding connection through the switch 20. Similarly at station 4 and elsewhere in the system the grounding switches, such as 21, are closed by the ground fault relays 23' and other apparatus associated therewith after the manner set forth in connection with the switch 20.

When all the grounding connections have been established in accordance with the basis on which the settings of the ground fault relays 14 are arranged, these relays become effective to isolate the faulty portion of the system. Thus, for example, the ground fault relays 14 at each end of the line 3 should function to trip their respective circuit breakers 6 and 7 so as to clear the fault X. As soon as the fault is cleared, current ceases to flow in the grounding connections through the grounding switches 20 and 21. Accordingly, the relay 41 at each grounding point responsive to the current through the grounding connection becomes deenergized and, under its bias, closes its contacts 46 to complete the circuit of the trip coil 47 through the sealing-in relay contacts 48 whereby to open the grounding switch 20 at the point in question. Thus, immediately, upon clearing of the fault, the system is restored to ground fault neutralizing operation so as to be ready for another fault.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, switching means operative in the current conducting condition to provide another connection to ground, means for placing said switching means in the current conducting condition a predetermined time after the occurrence of a ground fault on the system, and means for returning said switching means to the non-conducting condition operative in response to an increase in current in said other connection and a subsequent decrease in said current.

2. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, switching means operative in the current conducting condition to provide another connection to ground, means for placing said switching means in the current conducting condition a predetermined time after the occurrence of a ground fault on the system, and means for returning said switching means to the non-conducting condition operative in response to an increase in current in said other connection and a subsequent decrease in said current comprising a relay having a winding connected in series relation with said switching means between the switching means and ground.

3. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, switching means operative in the current conducting condition to provide another connection to ground, means for placing said switching means in the current conducting condition a predetermined time after the occurrence of a ground fault on the system, and means for returning said switching means to the non-conducting condition operative in response to an increase in current in said other connection and a subsequent decrease in said current comprising a relay operative to one position on an increase in current in said other connection and to another position on a subsequent decrease in said current and a sealing-in device connected to be operatively energized to the sealing-in position when said switching means is in the current conducting condition and said relay is in said one position.

4. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, switching means operative in the current conducting condition to provide another connection to ground, means for placing said switching means in the current conducting condition a predetermined time after the occurrence of a ground fault on the system, and means for returning said switching means to the non-conducting condition operative only in response to an increase in current in said other connection and a subsequent decrease in said current comprising a relay operative to one position on an increase in current in said other connection and to another position on a subsequent decrease in said current and a sealing-in device connected to be operatively energized to the sealing-in position when said switching means is in the current conducting condition and said relay is in said one position, and means controlled by said sealing-in device and said relay for effecting the return of said switching means to the noncurrent conducting condition on the subsequent decrease in current in said other connection.

5. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, a switch operative when closed to provide another connection to ground, means for closing said switch a predetermined time after the occurrence of a ground fault on the system, and means for opening said switch only after cessation of current flow in said other connection comprising tripping means, and means for controlling the actuation of said tripping means comprising a sealing-in relay and a two-contact position relay connected to be energized in dependence on the current flowing in said other connection operative to one contact position when the current in said other connection is in excess of a predetermined value to effect the energization of the sealing-in relay when the switch is closed and upon cessation of current flow in said other connection to another contact position to effect the actuation of said tripping means whereby to open said switch and to release the sealing-in relay from its sealed-in position.

6. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, a switch operative when closed to provide another connection to ground, means for closing said switch a predetermined time after the occurrence of a ground fault on the system, and means for opening said switch only after cessation of current flow in said other connection comprising tripping means, and means for controlling the actuation of said tripping means comprising a sealing-in relay, an energizing circuit for said sealing-in relay connected to be energized when said switch is closed and current above a predetermined value is flowing in said other connection, a sealing-in circuit for said sealing-in relay when said switch is closed and the sealing-in relay has been energized and an energizing circuit for said switching means arranged to be completed when the switch is closed, the sealing-in relay is in the sealed-in position and no current is flowing in said other connection.

7. In an alternating current electric system of the type in which a fault to ground on one phase conductor of the system substantially increases the capacitance current to ground of the ungrounded phase conductors of the system, an inductive connection to ground having a zero phase sequence inductance operative on the occurrence of a ground on a phase conductor of the system to provide a lagging current for effectively suppressing the capacitance current to ground at the grounded point, switching means operative in the current conducting condition to provide another connection to ground, means for placing said switching means in the current conducting condition a predetermined time after the occurrence of a ground fault on the system, and means for returning said switching means to the non-conducting condition only after cessation of current flow in said other connection comprising switch conducting condition changing means, and means for controlling said changing means comprising a sealing-in relay, and a relay connected to be energized in dependence on the current flowing in said other connection operative when the current therein is in excess of a predetermined value to effect an operation of said sealing-in relay to the sealed-in position when the switching means is in the circuit conducting condition and upon cessation of current flow in said other connection to effect the operation of said changing means whereby to return the switching means to the non-conducting condition and to release the sealing-in relay from its sealed-in position.

8. In an alternating current system having a neutral point and of the type in which a fault to ground on one phase conductor of the system substantially increases the capacitance current to ground of the ungrounded phase conductors of the system, an inductive device connected between said neutral point and ground and having a zero phase sequence inductance operative on the occurrence of a ground on a phase conductor of the system to provide a lagging current for effectively suppressing the capacitance current to ground at the grounded point, means for establishing another connection to ground from said neutral point a predetermined time after the occurrence of a ground fault which is not suppressed by said inductive device comprising a switch, and means responsive to the current flowing in said inductive device for effecting the closure of said switch, means for clearing system ground faults which are not suppressed by said inductive device, and means for opening said switch after cessation of current flow in said other connection as a result of the operation of said system ground fault clearing means comprising an opening coil, an energizing circuit for said coil, means for controlling said circuit comprising a sealing-in relay, and means responsive to the current in said other connection for actuating said sealing-in relay to its sealed-in position when the current in said other connection is above a predetermined value and establishing a break in said circuit and for completing said break when the current in said other connection falls below a certain predetermined value.

9. In an alternating current electric system having a normally ungrounded neutral point, switching means operative in the current conducting condition to provide a connection between said neutral point and ground, means operative on the occurrence of a ground fault on the system for placing said switching means in the current conducting condition, and means dependent upon the completion of said connection with current flow therein above a predetermined value and subsequently decreasing below a predetermined value for effecting the return of said switching means to the non-conducting condition.

LUKE F. KENNEDY.